(12) United States Patent
Koliczew

(10) Patent No.: US 6,298,072 B1
(45) Date of Patent: *Oct. 2, 2001

(54) REAL-TIME TRANSACTION SYNCHRONIZATION AMONG PEER AUTHENTICATION SYSTEMS IN A TELECOMMUNICATIONS NETWORK ENVIRONMENT

(75) Inventor: Victor Koliczew, Danville, CA (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,985

(22) Filed: Feb. 19, 1998

(51) Int. Cl.[7] ................. H04L 13/10; H04J 3/06
(52) U.S. Cl. ............... 370/503; 370/304; 370/324
(58) Field of Search .................... 370/304, 324, 370/350, 503; 395/186, 427; 380/25, 23, 21, 49

(56) References Cited

U.S. PATENT DOCUMENTS

| | | | |
|---|---|---|---|
| 5,481,720 | * 1/1996 | Loucks et al. | 395/700 |
| 5,572,193 | * 11/1996 | Flanders et al. | 340/825.34 |
| 5,721,780 | * 2/1998 | Ensor et al. | 380/25 |
| 5,799,084 | * 8/1998 | Gallagher et al. | 380/23 |
| 5,901,284 | * 5/1999 | Hamdy-Swink | 395/186 |
| 6,134,673 | * 10/2000 | Chrabaszcz | 714/13 |

* cited by examiner

Primary Examiner—Wellington Chin
Assistant Examiner—Brenda H. Pham

(57) ABSTRACT

System and method for synchronizing transaction data in real-time within a network environment. The system and method include and involve a plurality of authentication subsystems. Each authentication subsystem has a data storage subsystem and a processor. The processor is operative to receive a service request from a network user, and to authenticate the network user within the network environment in accordance with the service request. The service request causes a state stored within the data storage subsystem and related to the network user to change. The processor is further operative to transmit a synchronization request in real-time within the network environment, to receive another synchronization request from another authentication subsystem of the plurality of authentication subsystems, and to allow the processor to subsequently authenticate the network user within the network environment in accordance with the other synchronization request.

28 Claims, 7 Drawing Sheets

REAL-TIME TRANSACTION SYNCHRONIZATION AMONG PEER AUTHENTICATION SYSTEMS IN A TELECOMMUNICATIONS NETWORK ENVIRONMENT

BACKGROUND OF THE INVENTION

1. Field of the Invention

The present invention relates to the synchronization of authentication-type data among peer systems in a telecommunications network environment.

2. Description of the Related Art

As telecommunications and other network systems have become large and, often, geographically dispersed, servicing client populations and maintaining accurate, up-to-date authentication information has become extremely difficult. For example, providing system access to a client population in a wide are network (WAN) environment from multiple access points usually involves having to be able to authenticate and govern the access of users at corresponding, multiple points within the WAN. If one particular access point is not able to properly authenticate a particular user (e.g., as a result of system failure, etc.), another authentication system must be able to immediately respond, authenticate the user, and provide the user with an access path to the resources he seeks within the WAN.

Accordingly, there is a significant problem associated with providing authentication and authorization of users within large network environments such as within corporate WANs that may include geographically dispersed access and authentication systems which allow for remote access by users within a client population. This problem is exacerbated by the fact that authentication and authorization data must be globally accessible and up-to-date in order to effectively authenticate users within a particular client population.

To address the aforementioned problems in the typical telecommunications network environment, for example, peer authentication systems often have to engage in complex database redundancy operations to ensure that state data (e.g., state change data related to user account profiles such as client identification and accounting profiles) and other data relating to a particular client population are synchronized and replicated among actual peer systems that may service the client population. Such database redundancy operations, unfortunately, often are slow and provide only a very limited set of failure recovery capabilities.

Accordingly, there exists a serious need to provide systems and methods that enable synchronization of authentication information among distinct authentication systems within a network environment such as within a telecommunications network. To be effective, such systems and methods must allow for real-time transaction processing without relying on traditional, inefficient database management principles.

SUMMARY OF THE INVENTION

In view of the foregoing comments related to the related art, it is the principal object of the present invention to solve the aforementioned problems.

It is another object of the present invention to enable real-time synchronization of network authentication systems.

It is another object of the present invention to enable transaction requests from users within a client population to be efficiently and effectively processed during times when regular transaction processing systems are unavailable.

It is still another object of the present invention to enable authentication systems to be effectively added to and removed from an active network without disruption of services within that active network.

By achieving the aforementioned objects, the present invention provides certain benefits not heretofore realized. For example, the present invention will allow management organizations to deploy authentication systems that can efficiently offload transaction processing tasks to other systems during infrastructure enhancements and system failures. Additionally, administrators of systems implemented in accordance with the present invention may now be alerted to system resource unavailability before client populations are negatively affected. Finally, since transactions may be mirrored (synchronized) in real-time among peer authentication systems according to the present invention, there is no need for execution of complex database redundancy processes which are often slow and which have heretofore plagued telecommunications network systems.

The present invention achieves the above-stated objects and delivers the aforementioned benefits by providing a system for synchronizing transaction data within a network environment. The system includes a first authentication subsystem having a first synchronizing subsystem. The first authentication subsystem is operative to receive a service request from a network user, and to authenticate the network user within said network environment. The first synchronizing subsystem is operative to transmit a synchronization request in real-time within the network environment. The synchronizing request corresponds to the service request. Also included is a second authentication subsystem that is coupled to the first authentication subsystem and has a second synchronizing subsystem. The second synchronizing system receives the synchronization request from the first synchronizing subsystem. The synchronizing request allows the second authentication subsystem to subsequently authenticate the network user within the network environment.

According to another aspect of the present invention, provided is system for synchronizing transaction data in real-time within a network environment. The system includes a plurality of authentication subsystems. Each authentication subsystem has a data storage subsystem and a processor. The processor is operative to receive a service request from a network user, and to authenticate the network user within the network environment in accordance with the service request. The service request causes a state stored within the data storage subsystem and related to the network user to change. The processor is further operative to transmit a synchronization request in real-time within the network environment, to receive another synchronization request from another authentication subsystem of the plurality of authentication subsystems, and to allow the processor to subsequently authenticate the network user within the network environment in accordance with the other synchronization request.

According to a final aspect of the present invention, provided is a method for synchronizing transaction data within a network environment. The method includes the steps of receiving a service request from a network user, authenticating the network user within the network environment, and transmitting a synchronization request in real-time within the network environment. The synchronizing request corresponds to the service request. The method also includes the steps of receiving the synchronization request, and subsequently authenticating the network user within the network environment based on the synchronization request.

BRIEF DESCRIPTION OF THE DRAWINGS

The present invention is described in detail below with reference to the following drawing figures, of which.

DETAILED DESCRIPTION OF THE PREFERRED EMBODIMENTS

Figure 1:
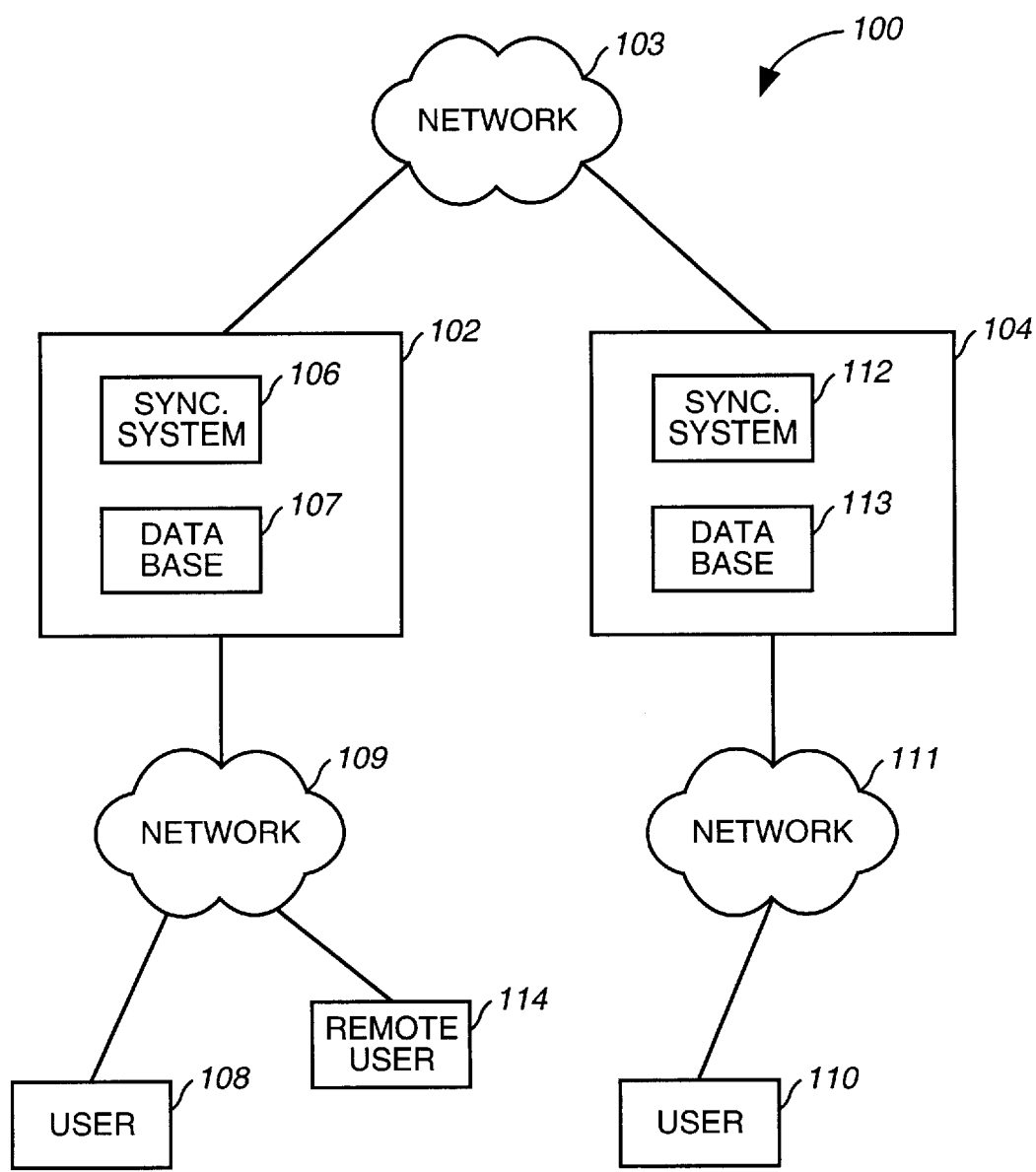
FIG. 1 is a block diagram of a telecommunications system wherein transaction information may be synchronized among peer authentication systems.

The present invention is now described in detail with regard to the drawing figures that were briefly described above. A SYSTEM DESCRIPTION section is followed by a SYSTEM OPERATION section. Unless otherwise indicated, like parts and processes are referred to with like reference numerals.

SYSTEM DESCRIPTION

Referring now to FIG. 1, depicted therein is a block diagram of a telecommunications system wherein transaction information may be synchronized among peer authentication systems according to a preferred embodiment of the present invention. In the case of the present invention, the term "synchronize" and all of its tenses refer to the act and/or state of multiple collections of data related to users within a network environment. As such, in FIG. 1, system 100 allows such synchronization by including an authentication system 102 that is coupled, via a network 103 (e.g., a TCP/IP based network environment, etc.), to an authentication system 104. Coupled to authentication 102, via network 109, is a user 108 and a remote user 114. Coupled to authentication system 104, via network 111, is a user 110.

Authentication system 102 includes a database storage subsystem 107 and a transaction synchronizing subsystem 106. Authentication system 104 includes a database storage subsystem 113 and a transaction synchronizing system 112. Although system 100 includes only two authentication systems, the present invention is not so limited. In fact any number of authentication systems may be deployed to allow synchronization and mirroring of transaction data in real-time. Such authentication systems are intended to authenticate and authorize users within system 100 and, in particular, to manage transaction requests and to arrange for and deliver network resource paths to service corresponding users service requests.

The authentication systems illustrated in FIG. 1 act as mirrors to each other across a network. That is, each authentication system acts as a live back-up system for each other system. Each authentication system services a number of users within a client community who may be correspondingly coupled to an authentication system via different networks (e.g., remote user 114 may be coupled to authentication system 102 via a different network than user 108). A typical operation scenario for the structures illustrated in system 100 is one where users make service requests (e.g., network messages that call for service and resource allocations like the establishment of frame relay resources from one point to another, etc.) and inquiries to authentication system 102. Such request messages received from users may take the form of computer readable and formatted streams of data. The particulars related to such service and transaction requests will be readily apparent to those skilled in the art. Authentication system 102 and, in particular, client handling services maintained therein, processes such service and transaction requests. System routines within authentication system 102 determine whether the user's request (e.g., access via a network connection that requires a change to login parameters such as a change in password or accounting information, etc.) produces a state change within system 100 that need to be mirrored among the other authentication systems within system 100. If a state change occurs, a mirror/synchronization request is made to synchronization subsystem 106. Synchronization subsystem 106 will then proceed to relay a user's request to mirror authentication systems (e.g., authentication system 104) on authentication system 102's mirror list (as stored in database subsystem 107 as further discussed below in regard to FIG. 2). In system 100, as only one other authentication system is participating as a mirrored/synchronized system, authentication system 104 will receive the mirror request and will process the request as if it was received directly from its own client population, with the exception that that it will not return a result and it will not mirror the mirrored request. All other processes related to the user's transaction request, however, will proceed as normal, thereby resulting in a state change identical to the change made by and within authentication system 102.

It should be understood that the authentication systems maintained within system 100 are intended to carry out basic functionality to ensure that users are allowed access to resources within a particular network environment. Many other systems such as telecommunications systems will be added to system 100 to provide application level processing. The authentication systems within system 100 ensure that network resources are accessed by users within recognized client populations. It is the ability of the present invention to synchronize authentication systems in real-time that allows a system like system 100 to seamlessly deliver network resource paths to users regardless of system failures and the like.

The synchronization of data within a system like or similar to system 100 is achieved through real-time messaging among authentication systems like authentication systems 102 and 104. Such messaging is achieved when automatic data processing systems (not shown) within authentication systems 102 and 104 format messages (e.g., digital data streams in the form of packet data, etc.) that may be sent and received within system 100. The generation, formatting, and management of such messages will be readily understood by those skilled in the art.

Based on the foregoing comments, there are two central aspects to the structure shown in FIG. 1 and, in particular, the structures that are included within an authentication system like authentication system 102. That is, authentication system 102 includes a database/transaction processing component (as indicated by data storage subsystem 107) and a synchronization component (as indicated by synchronization subsystem 106). The database function is implemented in part via a commercially available database software package such as a relational database management package like or similar to the ORACLE® database management system (e.g., ORACLE 7) which is manufactured and marketed by ORACLE CORPORATION. A suitable transaction manager to handle synchronization and mirror transactions is the TUXEDO™ software package (V.6.4) which is manufactured and marketed by BEA, INC.

Each authentication system maintains its own repository of authentication information, accounting information, user profile information, etc. The data maintained within the database/transaction processing component is kept identical to all other participating authentication systems within system 100 via the synchronization component. Moreover, the database component contains all of the data and information needed by all other structures within an authentication system including, but not limited to, configuration data, topology objects and abstracts, security profiles, and run time data.

The synchronization component enables synchronization among the authentication systems within system 100. Additionally, the synchronization component provides the capability of operating multiple instances of authentication systems within system 100. And, each authentication system services its own set of client populations and provides synchronization for all other authentication systems. In any case, in a mirrored configuration like system 100, each authentication system must have up-to-date and accurate state data related to all of the other authentication systems. Should one authentication system fail to operate appropriately, any other authentication system will be able to continue the workload of the unavailable authentication system. In system 100, all users have the capability of switching from a perceived unavailable authentication system to a backup or mirroring system. Preferably, an ordered list of mirror authentication systems is provided for clients and users and is automatically updated when changes are made to the list.

Figure 2:
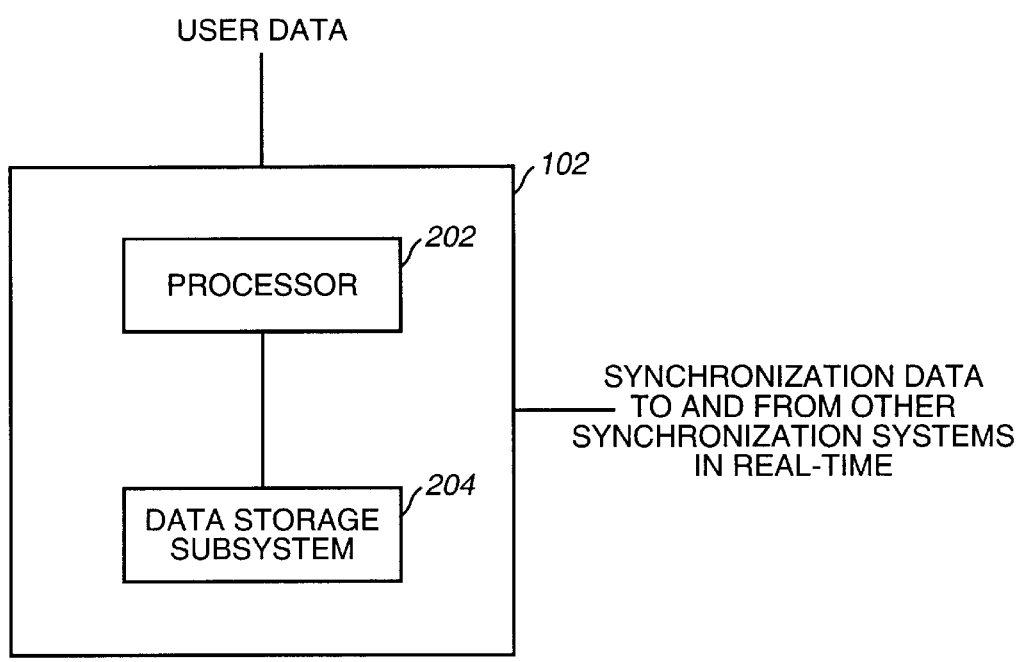
FIG. 2 is a block diagram of an authentication system like those depicted in FIG. 1.

Referring now to FIG. 2, depicted therein is a block diagram of an authentication system like authentication system 102 in FIG. 1. In particular, authentication system 102 includes a processor 202 and a data storage subsystem 204. Data storage subsystem 204 is configured to store transaction data processed by processor 202, and a mirror list including network addresses corresponding to other authentication systems within system 100.

Authentication system 102 is operative, as described below, to receive user request data (e.g., data corresponding to access and service requests—transactions—within system 100) and synchronization data to and from other authentication and synchronization subsystems maintained within system 100. Such operations may be carried out in accordance with appropriate computer software. A suitable computer system that may be used to bring about the operations of authentication system 102 is a SPARC 1000 computing system which is manufactured and marketed by SUN MICRO SYSTEMS, INC.

The processing and management of transactions within authentication system 102 are controlled in accordance with transaction management software. Suitable software to bring about transaction processing in real-time in accordance with the present invention is the TUXEDO transaction processing software package which was mentioned above.

A typical synchronization scenario is illustrated in FIG. 1. Synchronization of transactions and state change data in real-time according to the present invention allows peer authentication systems immediately to take over the operations of a troubled authentication system when failures occur. Such functionality will allow users, possibly from different client populations and communities, to be able access any given authentication system, request transactions such as allocation of network resources within system 100, and possibly engage in activities that require state changes and the like. When a state change occurs (e.g., when a user changes his password, when an accounting record needs to be stored, etc.), corresponding transactions will be transmitted to peer authentication systems in real-time to ensure that at any given instance in time, all such authentication systems will be maintained in synchronicity. And, by maintaining up-to-date transaction queues in real-time for unavailable authentication systems, client populations can immediately receive contracted services by simply directing service requests to authentication systems that are peers to their normal, but unavailable systems. Some failure scenarios that can occur within a network environment are illustrated in FIGS. 3 and 4.

Figure 3:
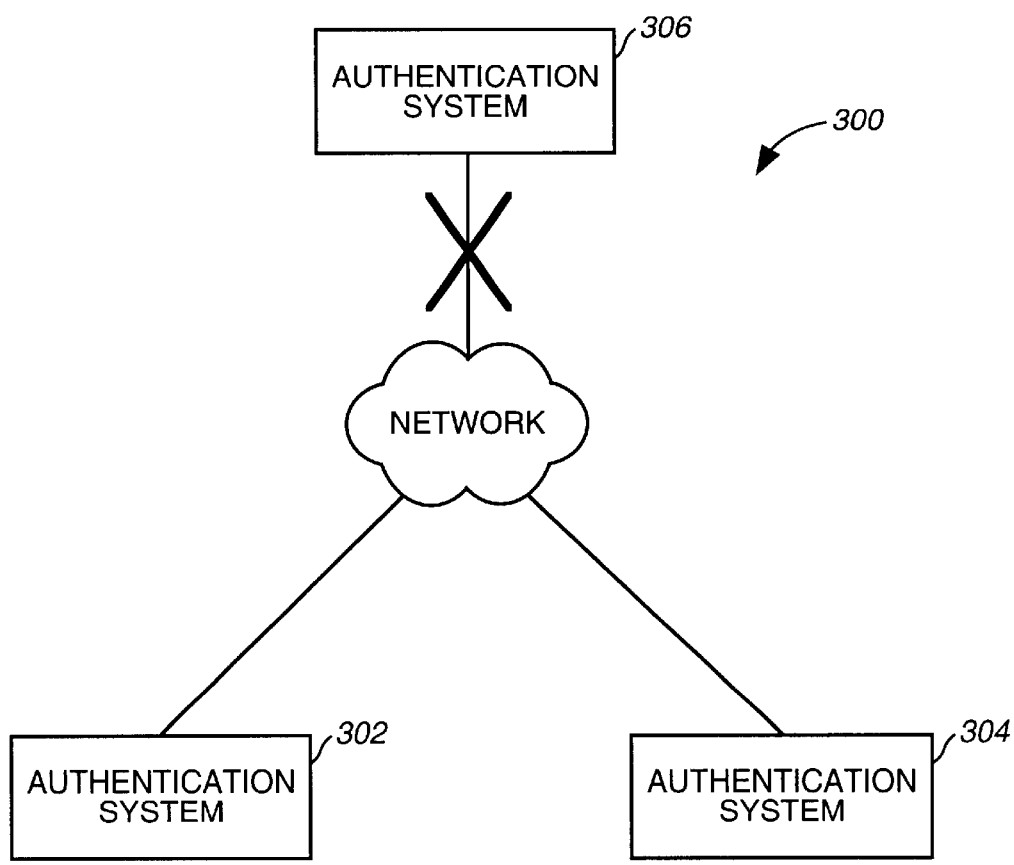
FIG. 3 is a block diagram of a telecommunications system wherein one authentication system is unavailable to authenticate users and corresponding service requests.

Referring now to FIG. 3, depicted therein is a block diagram of a telecommunications system wherein one authentication system has been rendered inoperable to authenticate users and process corresponding service requests and transactions. In particular, system 300 includes an authentication system 302, an authentication system 304, and an authentication 306 which are coupled to each other via a network 308. In system 300, authentication system 306 has been rendered inoperable (such as being taken offline, system failure, etc.). Accordingly, service inquiries and requests which would otherwise be processed by authentication system 306, will be routed to either authentication system 302 or authentication system 304 which maintain real-time synchronized (i.e., mirrored) transaction data and authentication data.

Figure 4:
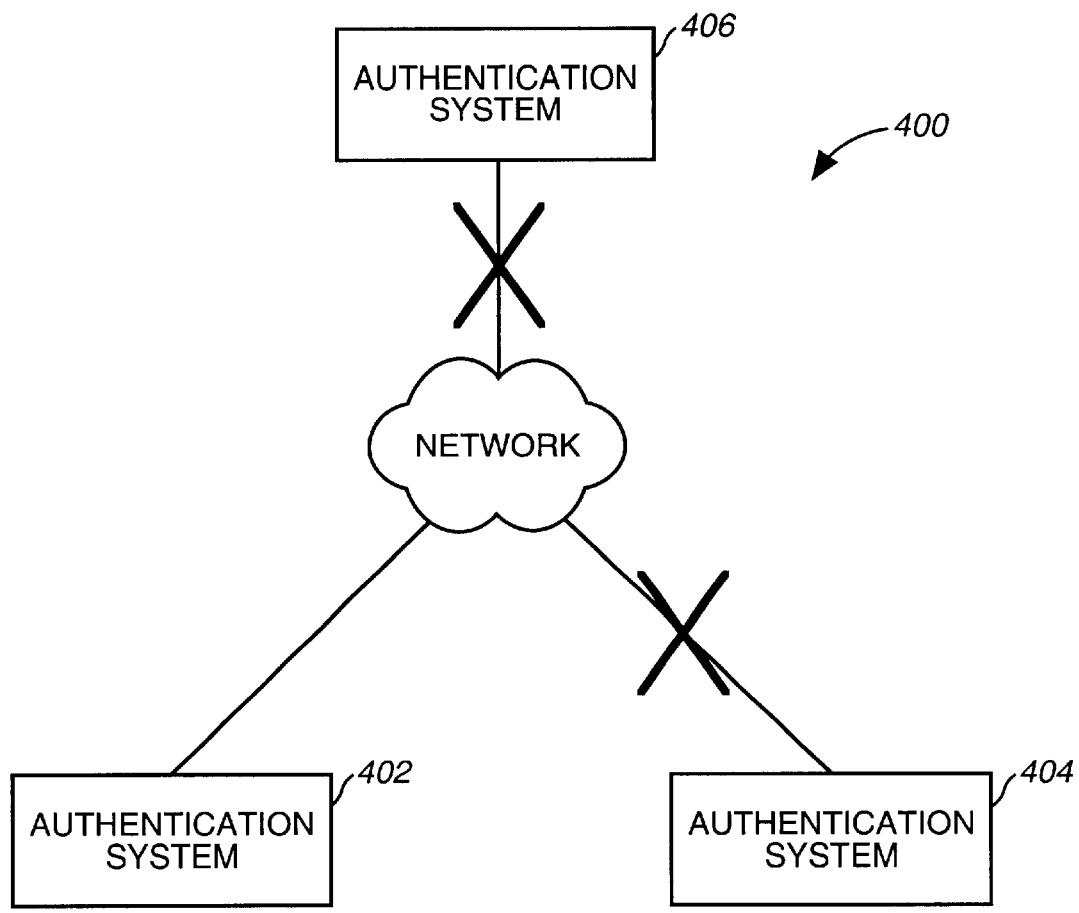
FIG. 4 is a block diagram of a telecommunications system wherein two authentication systems are unavailable to authenticate users and corresponding service requests.

Referring now to FIG. 4, depicted therein is a block diagram of a telecommunications system wherein two authentication systems have been rendered inoperable to authenticate users and process corresponding service requests and transactions. In particular, system 400 includes an authentication system 402, an authentication system 404, and an authentication 406 which are coupled to each other via a network 408. In system 400, authentication systems 404 and 406 have been rendered inoperable (such as being taken offline, system failure, etc.). Accordingly, service inquiries and requests which would otherwise be processed by authentication systems 404 and 406, will be routed to authentication system 402 which maintains real-time synchronized (i.e., mirrored) transaction data and authentication data. The transactions managed by authentication system 402 will be queued and later downloaded to authentication systems 404 and 406, respectively.

As noted above in regard to FIG. 1, the synchronization component (e.g., synchronization subsystem 106) is responsible for synchronizing data and transactions among participating authentication systems which are configured to mirror each other's transactions and system. While the normal operation scenario shown in FIG. 1 is generally straight forward, the possible failure scenarios depicted in FIGS. 3 and 4 involve some very complex issues. Moreover, the addition of authentication systems within an already existing network environment also involves an equally complex set of synchronization issues. And, synchronization practices would not be complete if there were no way to deactivate an active, participating authentication system. Accordingly, such issues can be said to concern the synchronization of domain wide state and data integrity, the joining of new mirror sites (e.g., adding new authentication systems), and deactivation of active authentication systems.

First Issue—Domain Wide State and Data Integrity

The first issue that must be dealt with in synchronizing multiple authentication systems concerns the management of authentication system failure scenarios. In particular, such management is concerned with how to preserve state and data integrity among authentication systems that are participating in a mirror configuration such as that shown in FIG. 3. Since the requirement is that all participating authentication systems service their own non overlapping set of clients, it is possible that should the link between two authentication systems become unavailable, the two authentication systems may continue to process client requests without propagating state changes to the other authentication systems. This situation would produce divergent states between authentication systems thereby resulting in assignment of duplicate resources to different clients. At that point, entire systems would loose integrity and recovery would be an arduous task. In order to prevent this from happening, synchronization subsystems (e.g., synchronization subsystem 106—FIG. 1) utilize the Durable Queuing subsystem of the TUXEDO™ system (cited above) and adhere to a set of rules which are followed to determine the failure scenario and to establish appropriate recovery procedures.

The Durable Queue subsystem of the TUXEDO™ system allows transactions to be queued for later delivery to a target system. This subsystem adheres to all of the rules and semantics governing transactions and transaction processing that may be present within a system like the depicted in FIG. 3. To the authentication system that is issuing and/or generating transactions, it will appear as though such transactions were successfully delivered to the unavailable authentication system. In FIG. 3 (as discussed above), three instances of the TUXEDO™ application have been deployed on the three authentication systems. As a failure scenario has rendered authentication system 306 unavailable, the other, active authentication systems 302 and 304, will each create a queue for transactions that will be directed to unavailable authentication system 306. When the unavailable authentication system 306 attempts restart, it will follow the restart rules with the depicted scenario as its starting point.

An exemplary set of rules that govern the synchronization of authentication systems and, in particular, the establishment and management of mirror queues are stated as follows:

Failure Anticipation Rules

1. Queues must be mirrored along with normal mirror traffic in the same transaction. This rule governs the case that when an authentication system becomes unavailable, there is a possibility one or more of the other authentication systems also may become unavailable at some time thereafter. As such, when a first unavailable authentication system begins a re-start procedure, it must be able to use the queue from an authentication system that has been active during the entire down-time of the first unavailable authentication system. This rule stipulates that when any one authentication system is determined to be unavailable by any active authentication system, the active authentication system will then create a queue for the unavailable authentication system and instruct the other active authentication system to do the same. After that point, all mirror transactions will also be posted to the queue of the unavailable authentication system in every active authentication system. Upon restart, the restarting authentication system will determine which active authentication system has the most complete queue and use it for resynchronization and beginning of normal operation.

2. Mirrors must determine isolation. If an active authentication system attempts to issue a mirror request to another authentication system and the request fails, then the sending authentication system must determine if the target authentication system is unavailable or the sending authentication system is physically isolated from other authentication systems. Isolation is determined by "pinging" the nearest router in a network environment. If no response from a ping is received, then the authentication system is isolated. The "other" authentication system is determined to be down if it cannot respond to a mirror request but others in the same sub-network environment can.

3. Isolated Authentication Systems must shutdown. This is a very important rule. If a mirror authentication system is isolated from participation in mirroring from other authentication systems but is able to service its client population then it must shutdown in order to ensure global state and data integrity. When downed authentication system becomes unavailable, the client population will switch to an active authentication system and continue without noticeable disruption in service.

4. If all other mirrors are down, then the active instance must continue to process requests and manage all queues.

Authentication System Restart Rules

1. Issue queue status request to all mirror participants (other authentication systems). A restarting authentication system will issue a request to all active participants for information regarding the queue that has been managed on behalf of the restarting system.

2. Determine which participant (authentication system) has the most complete queue. Each active participant will create and manage a queue for the unavailable participant. These queues are created with status information indicating the queue identifier, the creation time and the size. This information will be used by the restarting participant to determine which participant contains the most complete queue to be used for restart. In case of identical determinations, an arbitrary selection criteria will be used.

3. Process the complete queue. This step is necessary to perform a "catch up". The restarting participant will process each transaction in the queue as if it were issued at that particular point in time.

4. Create a temporary local queue for overlap processing. This step is necessary in order to continue processing current time transactions while the restart queue is being processed.

5. Completion of processing of the local queue determines operational readiness. Upon reaching this point of the restart process, the restarting participant has caught up and is prepared for resuming its set of responsibilities in real time.

6. Communicate availability to all participating authentication systems. This signal is issued to the entire client population of the restarting participant notifying them that they may switch back to their primary target authentication system. This becomes very important when the mirrors are separated by great geographical distances. Although the clients continue to be serviced, it may be more efficient to have them switch back to the participating authentication system in their proximity.

Second Issue—Joining a New Mirror to an Active Network Environment

The second issue that must be dealt with in synchronizing multiple authentication systems is concerned with the complexities of bringing a new authentication system into an already active network environment. The new participant system must undergo preparation prior to joining the network environment. After the basic preparation is complete, the new participant must "catch up" to the active participants. Accordingly, "basic preparation" and "catchup" are described as follows:

1. Basic Preparation: A new system that has been designated to join a mirror application must first be provided a "reasonably" current database as the starting point. This may be accomplished by first doing an "export" on the database from an active participant to the new participant. The "export" should duplicate the active database to a time mark selected by an administrator. At about the same time, the administrator should issue a message to the active participant authentication systems indicating that a new participant system is being prepared. Such a message will direct the synchronization subsystems of each active authentication system to begin a queue for the new participant immediately. From this point on, the active participants will treat the new participant as an unavailable participant.

2. Catch Up: Once a new participant has gone through basic preparation, it will proceed to behave according to the restart rules described above. Following the rules, the new participant will catch up from a complete queue managed by one of the active participants and then announce itself as "ready for real time" processing and, in particular, ready for real-time synchronization of transaction and state changes among all authentication systems within a particular network environment.

Third Issue—Deactivating an Active, Participating Authentication System

The third issue that must be dealt with in managing the synchronization of authentication systems within a network environment concerns the deactivation of active, participating authentication systems. In particular, to perform deactivation, the first step is to deactivate the client population of the authentication system that is to be deactivated. The second step is to remove the participant from the mirrors list of each other authentication system. This action will, in turn, issue a message to all of the synchronization subsystems of peer authentication systems that the mirror list has changed. The synchronization subsystems will then acquire from the database of the deactivated authentication system the new mirror list and use it immediately. Accordingly, no requests will be mirrored to the target participant. Once the target participant has been effectively removed from the network, it becomes unavailable and removed from participation in any synchronization processes as defined above.

System Operation

Figure 5A:
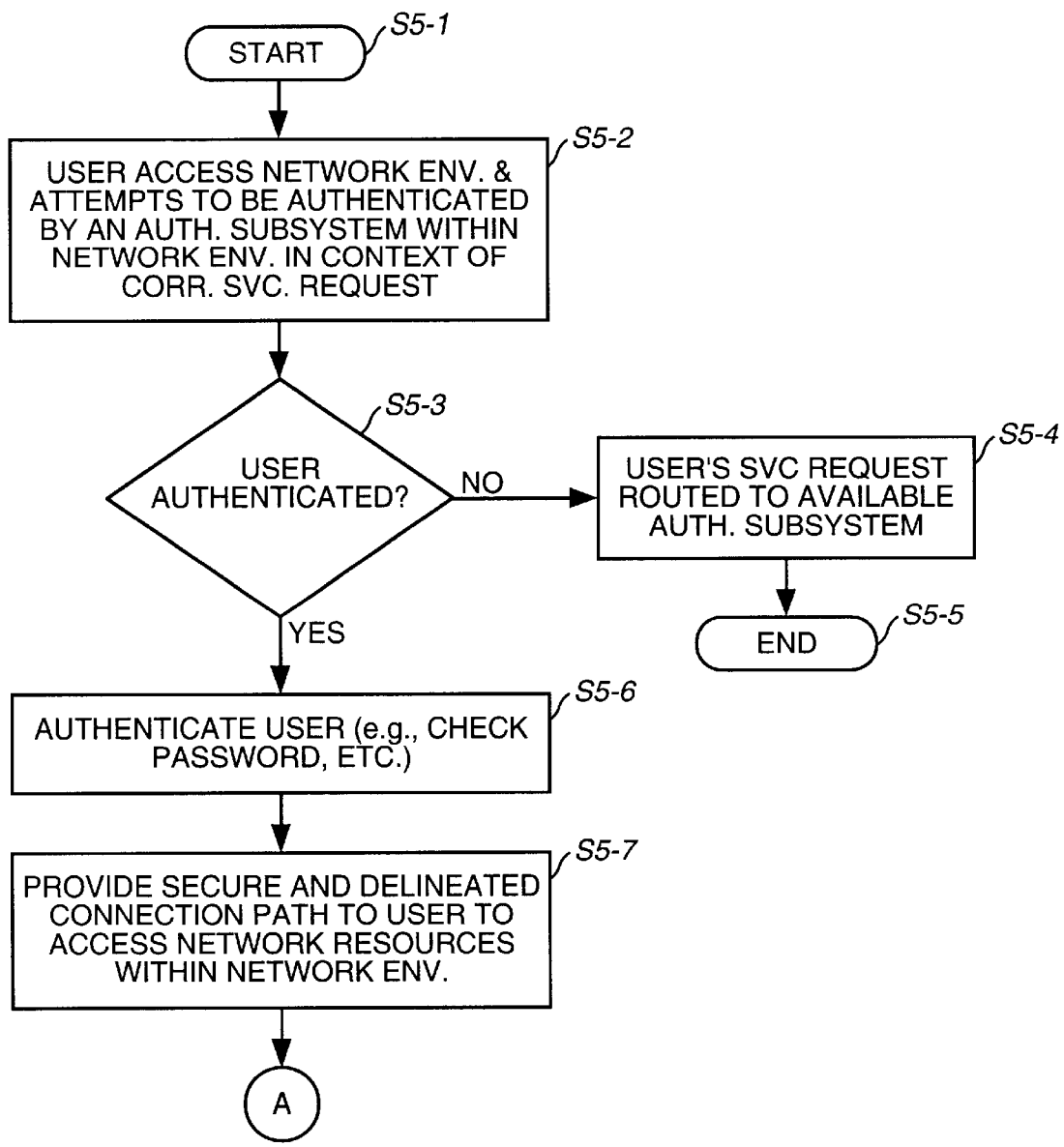
FIG. 5A is flowchart that illustrates the operations carried out within a telecommunications system according to a preferred embodiment of the present invention.
Figure 5B:
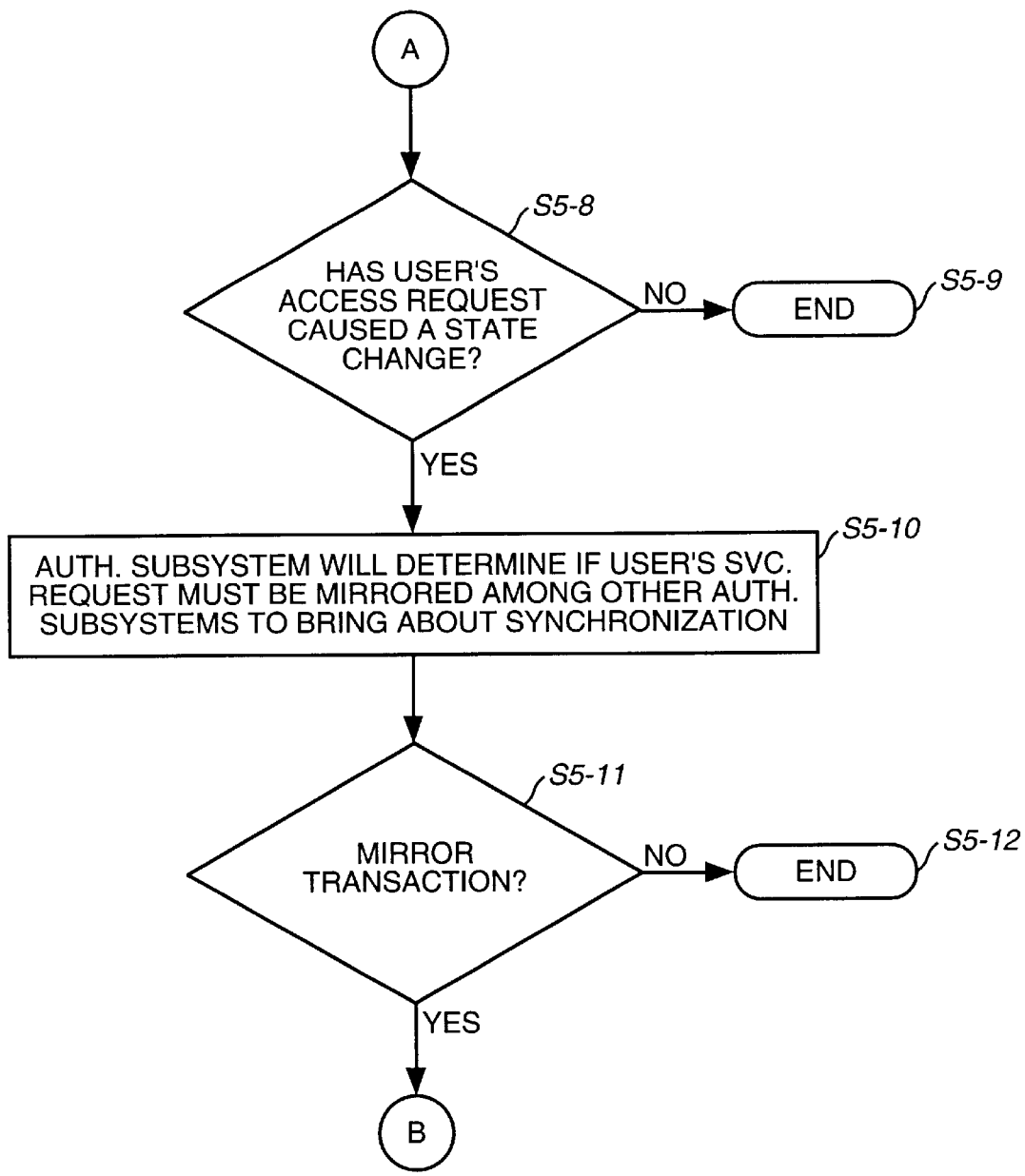
FIG. 5B is a continuation of the flowchart of FIG. 5A.
Figure 5C:
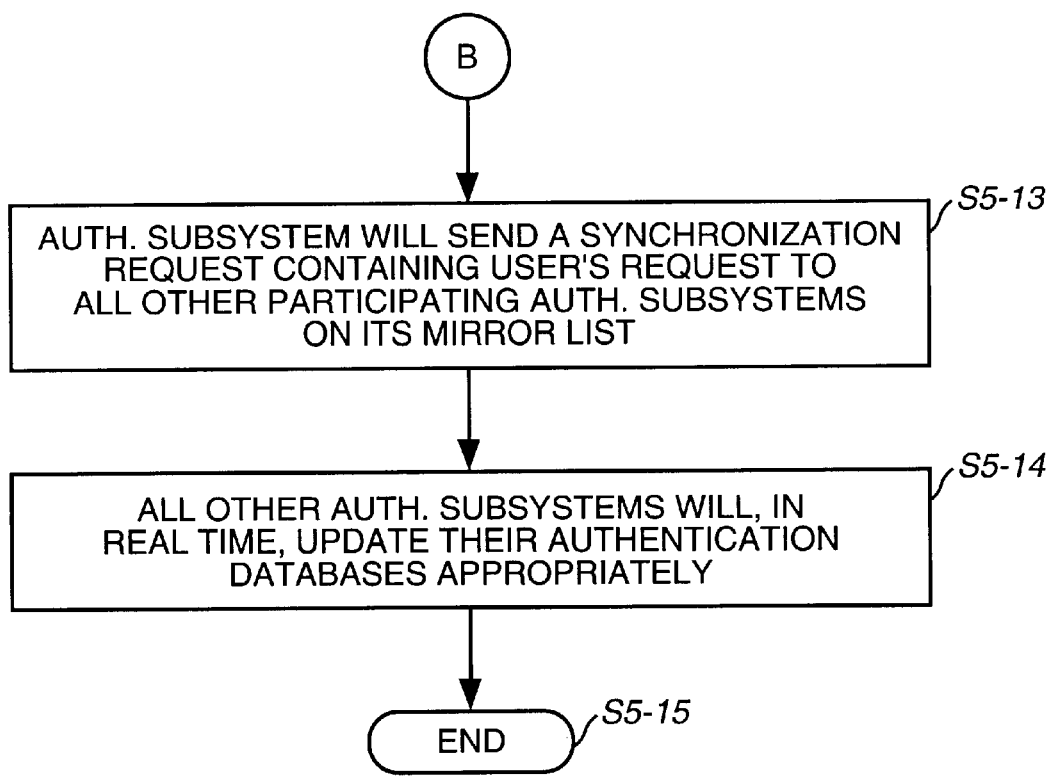
FIG. 5C is the conclusion of the flowchart illustrated in FIGS. 5A and 5B.

The structures depicted in FIGS. 1–4 are configured to operate together to provide real-time synchronized authentication and service request processing in relation to corresponding requests from users of a client population (e.g., from users of a corporate WAN environment). The requisite and salient operations to bring about such functionality and services are illustrated in the flowcharts depicted in FIGS. 5A, 5B, and 5C. The operations depicted in FIGS. 5A, 5B, and 5C are, in many respects, intended to be carried out via computer software that executes within an authentication system according to a preferred embodiment of the present invention. Such computer software and, in particular, the programming constructs necessary to bring about such operations will be readily apparent to those skilled in the art after reviewing and understanding the operations illustrated in FIGS. 5A, 5B, and 5C.

In regard to FIG. 5A, processing starts at Step S5-1 and immediately proceeds to Step S5-2.

At Step S5-2, a user will access a network environment (possibly via a remote connection) and attempt to be authenticated by an authentication subsystem within the network environment in the context of a corresponding service request. Next, at Step S5-3, a determination will be made as to whether the authentication system with which the user is associated is available for processing. If not, processing proceeds to Step S5-4 where the user's request will be routed to an available (peer) authentication sub-system for processing and processing will end at Step S5-5.

If the user's associated authentication subsystem is available, processing will proceed to Step S5-6 where the user and his request will be authenticated. And, at Step S5-7, the user will be provided with a connection path to requested resources.

Thereafter, processing proceeds as illustrated at the top of FIG. 5B.

At Step S5-7, the authentication system to which the user is coupled will determine if the user's transaction request caused a system state change (e.g., a transaction causing a change in password, an accounting/billing instance to be triggered, etc.). If not, processing ends at Step S5-9.

If a state change occurred as a result of the user's transaction request, processing proceeds to S5-10 where the authentication system will determine if user's transaction request must be mirrored or synchronized with other authentication systems (e.g., such as when a password is changed).

At Step S5-11, a mirroring (synchronization query is made). If no mirroring is to occur, processing ends at Step S5-12.

If mirroring is to occur, processing proceeds as illustrated at the top of FIG. 5C.

At Step S5-13, the user's authentication system will send, in real time, a mirror request (synchronization request message) to all other authentication systems on its mirror list. If any one authentication system in the network is unavailable to process transaction requests, then the user's authentication will queue the requests until such unavailable systems come back online in accordance with the rules described above.

And, at Step S5-14, all other authentication systems will, in real-time, update their authentication databases appropriately.

Processing ends at Step S5-15.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A system for mirroring transaction data within a network environment, comprising:

a first authentication subsystem having a first mirroring subsystem, said first authentication subsystem operative to receive a service request from a network user, and to authenticate said network user within said network environment, said first mirroring subsystem operative to transmit a mirror request in real-time within said network environment, said mirror request corresponding to said service request; and a second authentication subsystem coupled to said first authentication subsystem and having a second mirroring subsystem, said second mirroring subsystem receiving said mirror request from said first mirroring subsystem, said mirror request allowing said second authentication subsystem to subsequently authenticate said network user within said network environment, wherein said mirror request is transmitted within said network environment when said first authentication subsystem determines that said service request will require that said first authentication subsystem and said second authentication subsystem are to be mirrored.

2. The system according to claim 1, wherein said first authentication subsystem and said second authentication subsystem are coupled via a communications network.

3. The system according to claim 1, wherein said network environment is a telecommunications network system.

4. The system according to claim 1, wherein said second authentication subsystem is capable of authenticating said network user when said first authentication subsystem is unavailable.

5. The system according to claim 1, wherein said service request is a request to change user profile information related to said network user, and said mirror request includes an indication that said network user has changed said user profile information.

6. A system for mirroring transaction data within a network environment, comprising:

a first authentication subsystem having a first mirroring subsystem, said first authentication subsystem operative to receive a service request from a network user, and to authenticate said network user within said network environment, said first mirroring subsystem operative to transmit a mirror request in real-time within said network environment, said mirror request corresponding to said service request; and a second authentication subsystem coupled to said first authentication subsystem and having a second mirroring subsystem, said second mirroring subsystem receiving said mirror request from said first mirroring subsystem, said mirror request allowing said second authentication subsystem to subsequently authenticate said network user within said network environment, wherein said first authentication subsystem maintains a peer list including a list of peer authentication systems such as said second authentication subsystem, said first authentication subsystem being further operative to send said mirror request to each peer authentication system listed on said list of peer authentication systems.

7. A system for mirroring transaction data within a network environment, comprising:

a first authentication subsystem having a first mirroring subsystem, said first authentication subsystem operative to receive a service request from a network user, and to authenticate said network user within said network environment, said first mirroring subsystem operative to transmit a mirror request in real-time within said network environment, said mirror request corresponding to said service request; and a second authentication subsystem coupled to said first authentication subsystem and having a second mirroring subsystem, said second mirroring subsystem receiving said mirror request from said first mirroring subsystem, said mirror request allowing said second authentication subsystem to subsequently authenticate said network user within said network environment, wherein said first authentication subsystem and said second authentication subsystem further include respective first and second transaction managers, said first and second transaction managers are operative to service said user by designating particular network resources within said network environment based on said service request.

8. A system for mirroring transaction data in real-time within a network environment, comprising:

a plurality of authentication subsystems, each authentication subsystem having a data storage subsystem and a processor, said processor configured to receive a service request from a network user, to authenticate said network user with said network environment in accordance with said service request, said service request causing a state stored within said data storage subsystem and related to said network user to change, said processor further operative to transmit a mirror request in real-time within said network environment, to receive another mirror request from another authentication subsystem of said plurality of authentication subsystems, and to allow said processor to subsequently authenticate said network user within said network environment in accordance with said other mirror request, wherein said mirror request is transmitted within said network environment when a particular authentication subsystem determines that said service request will require that said plurality of authentication subsystems are to be mirrored.

9. The system according to claim 8, wherein said each authentication subsystem of said plurality of authentication systems are coupled to each other via a communications network.

10. The system according to claim 8, wherein said network environment is a telecommunications network system.

11. The system according to claim 8, wherein said each authentication subsystem of said plurality of authentication subsystems is capable of authenticating said network user when another authentication subsystem of said plurality of authentication subsystems is unavailable.

12. The system according to claim 8, wherein said state is a user profile related to said network user.

13. The system according to claim 12, wherein said user profile includes a user identifier and said service request includes a request to change said user identifier.

14. The system according to claim 12, wherein said state is an accounting record related to said network user and stored within said data storage subsystem, said service request causing a change to be made to said accounting record.

15. A system for mirroring transaction data in real-time within a network environment, comprising.

a plurality of authentication subsystems, each authentication subsystem having a data storage subsystem and a processor, said processor configured to receive a service request from a network user, to authenticate said network user with said network environment in accordance with said service request, said service request causing a state stored within said data storage subsystem and related to said network user to change, said processor further operative to transmit a mirror request in real-time within said network environment, to receive another mirror request from another authentication subsystem of said plurality of authentication subsystems, and to allow said processor to subsequently authenticate said network user within said network environment in accordance with said other mirror request, wherein said each authentication system of said plurality of authentication subsystems maintains a peer list including a list of peer authentication subsystems, said each authentication system of said plurality of authentication subsystems being further operative to send said mirror request to each peer authentication subsystem listed on said list of peer authentication subsystems.

16. A system for mirroring transaction data in real-time within a network environment, comprising:

a plurality of authentication subsystems, each authentication subsystem having a data storage subsystem and a processor, said processor configured to receive a service request from a network user, to authenticate said network user with said network environment in accordance with said service request, said service request causing a state stored within said data storage subsystem and related to said network user to change, said processor further operative to transmit a mirror request in real-time within said network environment, to receive another mirror request from another authentication subsystem of said plurality of authentication subsystems, and to allow said processor to subsequently authenticate said network user within said network environment in accordance, wherein said each authentication subsystem of said plurality of authentication subsystems further includes a transaction manager, said transaction manager operative to service said user by designating particular network resources within said network environment based on said service request.

17. A system for mirroring transaction data in real-time within a network environment, comprising:

a plurality of authentication subsystems, each authentication subsystem having a data storage subsystem and a processor, said processor configured to receive a service request from a network user, to authenticate said network user with said network environment in accordance with said service request, said service request causing a state stored within said data storage subsystem and related to said network user to change, said processor further operative to transmit a mirror request in real-time within said network environment, to receive another mirror request from another authentication subsystem of said plurality of authentication subsystems, and to allow said processor to subsequently authenticate said network user within said network environment in accordance with said other mirror request, wherein said service request is a request to change user profile information related to said network user, and said mirror request includes an indication that said network user has changed said user profile information.

18. A system for mirroring transaction data in real-time within a network environment, comprising:

an authentication subsystem having a data storage subsystem and a processor, said processor operative to receive a service request from a network user coupled to said network environment, to authenticate said network user within said network environment in accordance with said service request and based on a corresponding user profile stored within said data storage subsystem, said service request causing a state related to said network user to change, to receive a mirror request in real-time, and to allow said processor to subsequently authenticate said network user within said network environment in accordance with said mirror request, wherein said authentication subsystem maintains a peer list including a list of peer authentication subsystems, said authentication system being further operative to send said mirror request to each peer authentication subsystem listed on said list of peer authentication subsystems.

19. The system according to claim 18, wherein said network environment is a telecommunications network system.

20. A system for mirroring transaction data in real-time within a network environment, comprising:

an authentication subsystem having a data storage subsystem and a processor, said processor operative to receive a service request from a network user coupled to said network environment, to authenticate said network user within said network environment in accordance with said service request and based on a corresponding user profile stored within said data storage subsystem, said service request causing a state related to said network user to change, to receive a mirror request in real-time, and to allow said processor to subsequently authenticate said network user within said network environment in accordance with said mirror request, wherein said each authentication system further includes a transaction manager, said transaction manager operative to service said user by designating particular network resources within said network environment based on said service request.

21. A method for mirroring transaction data in real-time within a network environment, comprising the steps of:

receiving a service request from a network user;

authenticating said network user within said network environment in accordance with said service request, said service request causing a state related to said network user to change;

receiving a mirror request in real-time; and subsequently authenticating said network user with said network environment in accordance with said mirror request, wherein said state relates to a billing record within said network environment.

22. The method according to claim 21, wherein said service request includes a request to allocate resources within said network environment.

23. The method according to claim 21, wherein said network environment includes a plurality of authentication systems and said method further comprises the step of mirroring each authentication system of said plurality of authenication systems based on said mirror request.

24. The method according to claim 21, wherein said authenticating step further comprises the step of permitting network access within said network environment to said network user.

25. A method for mirroring transaction data in real-time within a network environment, comprising the steps of:

receiving a service request from a network user;

authenticating said network user with said network environment in accordance with said service request, said service request causing a state related to said network user to change; and broadcasting a mirror request in real-time via said network environment, said network user able to be subsequently authenticated within said network environment in accordance with said mirror request, wherein said state relates to a billing record corresponding to said network user within said network environment.

26. The method according to claim 25, wherein said service request includes a request to allocate resources within said network environment.

27. The method according to claim 25, wherein said network environment includes a plurality of authentication systems and said method further comprises the step of mirroring each authentication system of said plurality of authentication systems based on said mirror request.

28. The method according to claim 25, wherein authenticating step further comprises the step of permitting network access within said network environment to said network user.

* * * * *